(No Model.)
O. LUGO.
SECONDARY BATTERY.
No. 458,424. Patented Aug. 25, 1891.
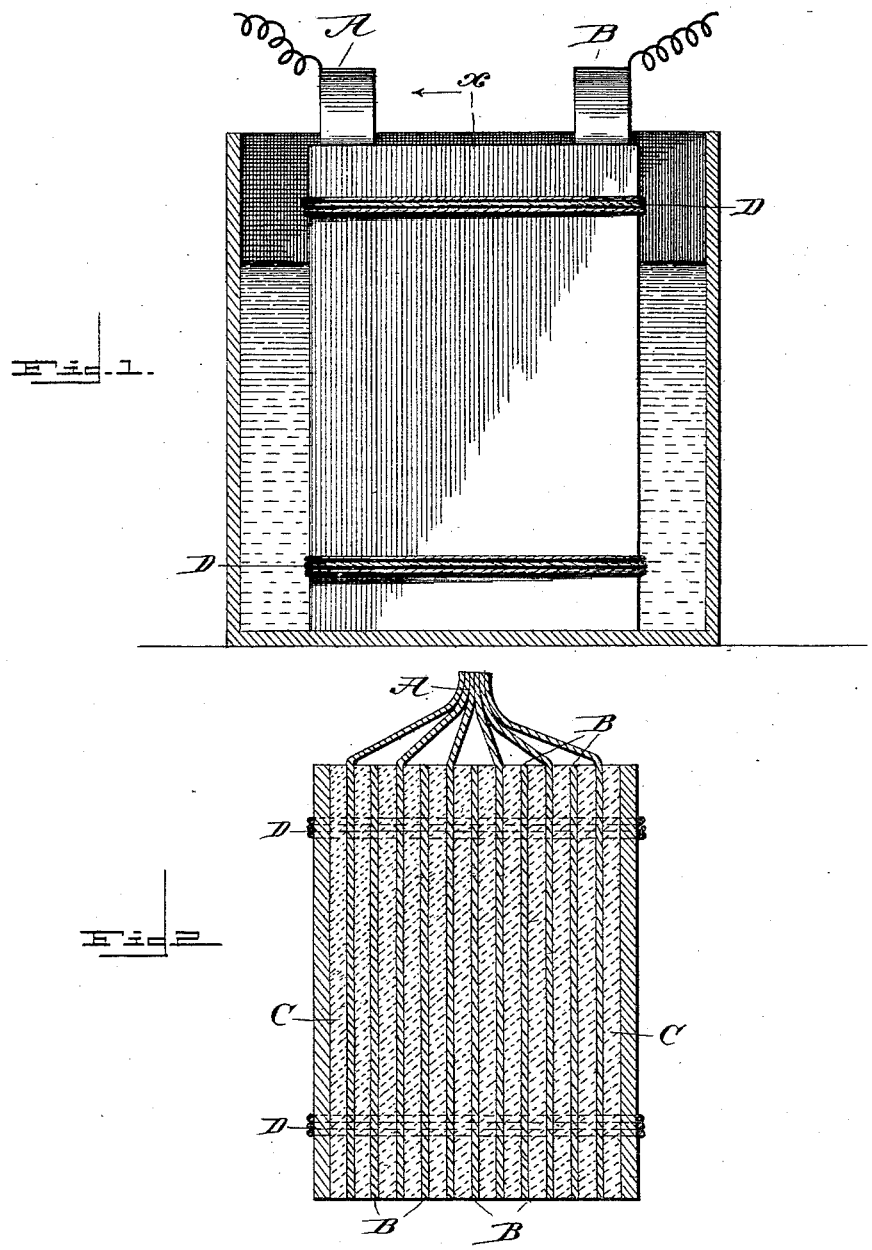
Witnesses,
N. H. Pumphrey.
L. B. Keeler.
Inventor,
Orazio Lugo,
by A. S. Dyrenforth.
his Attorney.

UNITED STATES PATENT OFFICE.

ORAZIO LUGO, OF NEW YORK, N. Y.

SECONDARY BATTERY.

SPECIFICATION forming part of Letters Patent No. 458,424, dated August 25, 1891.

Application filed May 26, 1891. Serial No. 394,167. (No model.)

*To all whom it may concern:*

Be it known that I, ORAZIO LUGO, a citizen of the United States, residing at New York, in the county of New York and State of New York, have invented certain new and useful Improvements in Secondary Batteries; and I do hereby declare the following to be a full, clear, and exact description of the invention, such as will enable others skilled in the art to which it appertains to make and use the same.

This invention relates to that class of electric batteries which give no electricity of themselves unless they have previously been included in a circuit with a source of electricity, in contradistinction to an ordinary galvanic or primary battery.

The object of the invention is to produce a secondary battery in which there will be no chemical action when not in use, thus conserving the energy of the battery.

With this object in view the invention consists in forming electrodes for a secondary battery by placing relatively electro-positive and electro-negative metals or substances in a suitable bath which will not act primarily upon either electrode and then passing a current of electricity through them; furthermore, in charging electrodes for a secondary battery by placing formed relatively positive and negative metals or substances in a suitable bath which will not act primarily upon either electrode, but will act secondarily upon both, and subjecting them in this bath to the action of electricity, and, finally, in a secondary electric or so-called "storage" battery, consisting of a relatively positive metal or substance, such as zinc, and a relatively negative metal or substance, such as lead, suitably formed and charged and placed in a liquid, such as a solution of borate of ammonia, which will not act primarily upon either element, but will act secondarily upon both.

One form of embodiment of the invention is illustrated in the accompanying drawings, in which—

Figure 1 is a sectional view of a cell made in accordance with my invention, and Fig. 2 is a sectional view, the section being taken on the line *x x* of Fig. 1.

In making the battery the plates A and B are preferably arranged as shown in the drawings, the surfaces of the lead plates A and the zinc plates B being separated by pieces C of some absorbent substance or material—such, for instance, as cloth or bibulous paper—and when ready for use the plates will be bound together by strips D of cloth, rubber, or the like.

While I have described the use of plates of lead and of zinc, I do not of course wish to limit myself to the employment of just these metals, as proper elements of the same metal or any two metals occupying different positions in the electric scale and not acted upon primarily by the electrolyte may be employed.

In forming the plates are suspended in a solution of borate of ammonia of, say, from 10° Baumé to saturation, the current of electricity used for the purpose passing from the lead to the zinc electrode when plates of these metals are used, and it may be preferable to form before binding the plates together. If the plates are formed before binding together, they are then bound together in the manner illustrated in the drawings with layers of absorbent material interposed between them, are put into a bath of a solution of borate of ammonia, as above, and are charged, and all the plates may have been connected either in multiple arc or in series during this operation, as preferred.

The voltage of this battery is very high, the internal resistance low, and the ampère capacity very high. The battery can be charged by very heavy currents and also discharged with a maximum amperage without in the least injuring the plates as electrodes. The constancy of this battery is supposed to be due to the influence of the zinc or other appropriate positive element, as above, on the active material in contact with it in preventing the oxidation thereof or elimination of hydrogen or a compound of hydrogen.

Another advantage of this battery is that the electrolyte, being neutral, the battery can be placed in a wooden tank or cup with perfect safety. The electrolyte has no action on the materials by which the surfaces of the plates are separated and by which the plates and separating-pieces are bound together, and the receptacles for containing the plates and the electrolyte may even be of wood or the like.

Having thus described my invention, what I claim as new, and desire to secure by Letters Patent, is—

1. In combination with metallic or other substance for a secondary or storage battery a solution of borate of ammonia.

2. A relatively electro-positive metal or substance, such as zinc, and a relatively electro-negative metal or substance, such as lead, in a solution of borate of ammonia, which will not act primarily upon either, but will act secondarily upon both.

3. A secondary or so-called "storage" battery consisting of a relatively positive metal or substance, such as zinc, and a relatively negative metal or substance, such as lead, suitably formed and charged and placed in a solution of borate of ammonia, which will not act primarily upon either electrode, but will act secondarily upon both, substantially as set forth.

In testimony whereof I affix my signature in presence of two witnesses.

ORAZIO LUGO.

Witnesses:
F. B. KEEFER,
DAVID H. MEAD.